(12) United States Patent
Nakayama et al.

(10) Patent No.: US 6,703,615 B2
(45) Date of Patent: Mar. 9, 2004

(54) LIGHT RECEIVING AND EMITTING PROBE AND LIGHT RECEIVING AND EMITTING PROBE APPARATUS

(75) Inventors: Yoshikazu Nakayama, 9-4D4, 14-2, Kongsoke 1-chome, Hirakata-shi, Osaka 573-0084 (JP); Akio Harada, Osaka (JP)

(73) Assignees: Yoshikazu Nakayama, Osaka (JP); Daiken Chemical Co., Ltd., Osaka (JP)

( * ) Notice: Subject to any disclaimer, the term of this patent is extended or adjusted under 35 U.S.C. 154(b) by 64 days.

(21) Appl. No.: 10/074,623

(22) Filed: Feb. 13, 2002

(65) Prior Publication Data

US 2002/0109082 A1 Aug. 15, 2002

(30) Foreign Application Priority Data

Feb. 13, 2001 (JP) .......................................... 2001-081672

(51) Int. Cl.[7] .......................... H01J 40/14; G01N 23/00; G01B 5/28
(52) U.S. Cl. ...................... 250/306; 250/307; 250/234; 73/105
(58) Field of Search ................................. 250/234, 306, 250/307; 73/105

(56) References Cited

U.S. PATENT DOCUMENTS 5,770,856 A * 6/1998 Fillard
6,252,226 B1 * 6/2001 Kley

* cited by examiner

Primary Examiner—David Porta
Assistant Examiner—David C. Meyer
(74) Attorney, Agent, or Firm—Koda & Androlia

(57) ABSTRACT

A light receiving and emitting probe including a conductive nanotube probe needle with its base end fastened to a holder and its tip end protruded, a light receiving and emitting body formed on this probe needle, a lead wire fastened to the light receiving and emitting body, and a power supply that applies an electric voltage between both ends of the lead wire and the probe needle. Light is emitted and received by the light receiving and emitting body when an electric current passes through the light receiving and emitting body. A light receiving and emitting probe apparatus includes the above-described light receiving and emitting probe, a scanning mechanism that allows the light receiving and emitting probe to scan over a sample, and a control circuit that causes the light receiving and emitting body of the light receiving and emitting probe to receive and emit a light.

4 Claims, 6 Drawing Sheets

LIGHT RECEIVING AND EMITTING PROBE AND LIGHT RECEIVING AND EMITTING PROBE APPARATUS

BACKGROUND OF THE INVENTION

1. Field of the Invention

The present invention relates to a light receiving and emitting probe and to a light receiving and emitting probe apparatus that illuminate extremely small regions on the surface of a sample and receives light from such extremely small regions.

2. Prior Art

In the past, the development of light emitting materials has progressed very rapidly, and a new technical field known as opto-electronics, which uses light and electrons, has been proposed. Various technical developments such as light emitting diodes, laser diodes, plasma, fluorescence, liquid crystals, electroluminescence and optical ICs, etc. have been accomplished in this field.

However, such optical techniques deal mainly with regions in which the size of the visual field is on the naked-eye level or optical-microscopic level, and they do not deal with nano-regions, in which there has been rapid development in recent years. Techniques for illuminating very small regions by way of optical fibers have been developed. However, since optical fibers cannot be reduced to nano-size, free control of illumination and extinction in nano-regions is not possible.

Meanwhile, atomic force microscopes (AFM) and scanning type tunnel microscopes (STM) have been developed, and techniques for imaging sample surfaces at the atomic level or controlling the movement of atoms on sample surfaces are under development. In connection with the development of such techniques, there is a need for optical techniques that allow efficient pinpoint illumination and extinction in nano-size regions.

In recent years, optical fiber techniques that propagate evanescent waves in optical fibers have been proposed. In such optical fiber techniques, extremely small regions are illuminated by way of utilizing light that oozes out from the tip end of an optical fiber. However, such techniques suffer from numerous problems in terms of, among others, manufacture of the tip end opening portions and handling of the fibers. Furthermore, since the light intensity of evanescent waves attenuates exponentially, the light utilization efficiency is not good. In other words, inversely proportionate to the size of the demand for nano-region light emitting technique, there has been no nano-region light emitting technique so far that can be effectively utilized.

SUMMARY OF THE INVENTION

Accordingly, it is an object of the present invention to provide a light receiving and emitting probe and a light receiving and emitting probe apparatus with a nano-region illumination technique that allows pinpoint illumination and pinpoint extinction in nano-regions on the surfaces of substances, thus effectively utilizing such nano-regions.

It is another object of the present invention to provide a light receiving technique that makes it possible to receive light emitted from extremely small regions, nano-regions, on the surfaces of samples.

In other words, the present invention is for a light receiving and emitting probe and a light receiving and emitting probe apparatus in which a light receiving and emitting body is formed on the side surface of a conductive nanotube probe needle fastened to a holder and in which a light receiving and emitting body is formed on the side surface of the protruding portion of an AFM cantilever, thus receiving and emitting light by this light receiving and emitting body.

More specifically, the above objects are accomplished by a unique structure of the present invention for a light receiving and emitting probe that comprises:
- a conductive nanotube probe needle with its base end portion fastened to a holder and its tip end portion protruded,
- a light receiving and emitting body which is provided on the circumferential surface of the conductive nanotube probe needle, and
- a conductive nanotube lead wire fastened to the light receiving and emitting body.

Moreover, the above light receiving and emitting probe can be further provided with a means that applies an electric voltage between both ends of the conductive nanotube lead wire and the conductive nanotube probe needle, so that light can be received and emitted by the light receiving and emitting body.

In the light receiving and emitting probe of the present invention, an AFM cantilever in which a protruding portion used as the holder is formed on a cantilever portion thereof is employed, two electrode films are formed on the cantilever portion, one end of the conductive nanotube lead wire is connected to one of the electrode films, and the conductive nanotube probe needle is connected to another of the electrode films, so that an electric voltage is applied between the electrode films.

Furthermore, in the present invention, an AFM cantilever in which a protruding portion used as the holder is formed on a cantilever portion thereof is employed, two electrode films are formed on the cantilever portion, one end of the conductive nanotube lead wire is connected to one of the electrode films, the conductive nanotube probe needle and the other of the electrode films are connected by means of another conductive nanotube lead wire, so that an electric voltage is applied between the electrode films.

In addition, the above objects are accomplished by another unique structure of the present invention for a light receiving and emitting probe, in which an AFM cantilever that has a protruding portion formed on a cantilever portion thereof is employed, two electrode films are formed on the cantilever portion, and a light receiving and emitting body is formed near a tip end of the protruding portion, so that both ends of the light receiving and emitting body and the two electrode films are made electrically continuous, and the light receiving and emitting body is caused to receive and emit light by causing an electric current to pass between the two electrode films.

Furthermore, the above objects are accomplished by a unique structure of the present invention for a light receiving and emitting probe apparatus that comprises:
- the light receiving and emitting probe described above,
- a scanning mechanism that operates the light receiving and emitting probe to scan over a sample, and
- a control circuit that causes light to be received and emitted by a light receiving and emitting body of the light receiving and emitting probe.

DETAILED DESCRIPTION OF THE INVENTION

Embodiments of the light receiving and emitting probe and light receiving and emitting probe apparatus of the present invention will be described in detail below with reference to the accompanying drawings.

Figure 1:
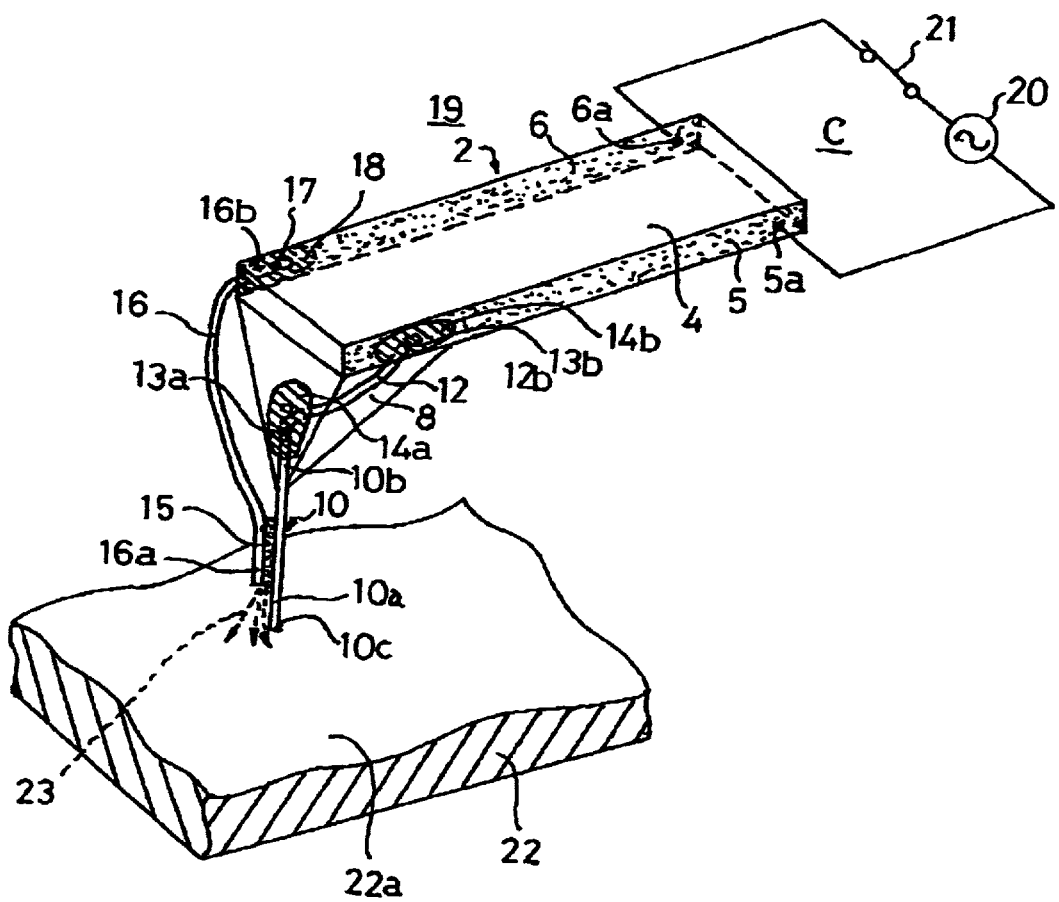
FIG. 1 is a schematic perspective view of a first embodiment of the light receiving and emitting probe according to the present invention.

FIG. 1 shows the first embodiment of the light receiving and emitting probe of the present invention.

The light receiving and emitting probe 19 is obtained by machining an AFM cantilever 2. The cantilever 2 is comprised of a cantilever portion 4 and a holder 8 (which is also called a protruding portion or pyramid portion), and the holder 8 protrudes from the tip end of the cantilever portion 4.

Electrode films 5 and 6 are provided on both side surfaces of the cantilever portion 4. These films are formed by coating the side surfaces of the cantilever portion 4 with a conductive substance. A control circuit C is connected to the rear ends of the electrode films 5 and 6 via contact points 5a and 6a. The control circuit C is comprised of a power supply 20 used for voltage supply (or current supply) and a switch 21. In the shown embodiment, an alternating-current power supply is used as the power supply 20 in connection with the light receiving and emitting body described below.

A conductive nanotube probe needle 10 is disposed on the holder 8. The conductive nanotube probe needle 10 is obtained by fastening the base end portion 10b of a conductive nanotube to the holder 8 and by setting the tip end portion 10a of the conductive nanotube so as to protrude downward. The tip end 10c is located near the surface of a sample 22.

The base end portion 10b of the conductive nanotube needle probe 10 is thermally fused to the holder 8 by irradiation with an electron beam. It is also possible to thermally fuse these elements by passing an electric current through the elements. It is also possible to fasten these elements by means of coating films instead of using such fastening by thermal fusion.

A conductive nanotube lead wire 12 is installed between this base end portion 10b of the conductive nanotube needle probe 10 and the electrode film 5, and both ends of this lead wire 12 are fastened by thermal fusion in thermally fused portions 13a and 13b. Coating films may also be used instead of this thermal fusion. Furthermore, coating films 14a and 14b are formed above the thermally fused portions 13a and 13b. Accordingly, the conductive nanotube probe needle 10 and the conductive nanotube lead wire 12 are strongly fastened to the holder 8 and electrode film 5.

A light receiving and emitting body 15 is formed by deposition (effected by the passage of an electric current) on a specified portion of the circumferential surface of the conductive nanotube probe needle 10. This light receiving and emitting body 15 is caused to emit light and conversely receive light as well by passing an electric current through the light receiving and emitting body 15.

A conductive nanotube lead wire 16 is disposed between the light receiving and emitting body 15 and the electrode film 6. The end portions 16a and 16b of the lead wire 16 are respectively joined to the light receiving and emitting body 15 and electrode film 6 by thermal fusion. Coating films may also be used instead of this thermal fusion. Such coating films can be formed by PVD (physical vapor deposition) process or CVD (chemical vapor deposition) process on a physically adsorbed surface.

The thermally fused portion 17 of the lead wire end portion 16b is further strongly fastened to the electrode film 6 by a coating film 18. This strong fastening is obtainable by forming a coating film on the lead wire end portion 16a, which covers the entire outer circumference as an integral unit with the conductive nanotube probe needle 10. However, this outer circumferential coating film is not shown in the drawings.

Nanotubes can be divided generally into conductive nanotubes and insulating nanotubes. Conductive nanotubes include nanotubes that conduct electricity such as carbon nanotubes, and insulating nanotubes include non-conductive nanotubes such as BCN (boron carbonitride) type nanotubes and BN (boron nitride) nanotubes, etc. If a conductive coating film is formed on the surface of an insulating nanotube by a known method such as PVD, CVD, etc., then this nanotube can be endowed with conductivity; accordingly, such nanotubes also belong to the category of conductive nanotubes.

In the present invention, a voltage is applied to the nanotube probe needle and nanotube lead wires, so that an electric current is caused to pass through the needle and lead wires. Accordingly, the nanotubes must possess electrical conductivity. Thus, the nanotube probe needle and nanotube lead wires are referred to as a conductive nanotube probe needle and conductive nanotube lead wires.

The coating films may be formed by irradiating specified locations with an electron beam, thus breaking down the organic substances that are present as impurities inside the electron microscope apparatus so that carbon is deposited in such specified locations. Of course, if an organic substance deposited in the specified locations is irradiated, substances other than carbon will be scattered; and carbon will remain so as to form the coating films. Naturally, it is also possible to introduce an organic gas into the electron microscope apparatus and break down this gas. A similar treatment may also be performed using an ion beam instead of an electron beam.

An electroluminescent material is used as the material of the light receiving and emitting body utilized in the shown embodiment. Such electroluminescent materials include inorganic materials and organic materials. A typical example of an inorganic material is ZnS. The color of the light that is emitted can vary by adding activating agents to ZnS. Organic materials include conjugate polymers such as anthracene, etc.

To give examples of activating agents that are added to the inorganic materials and the colors of the light that is emitted as a result, a yellow-orange color is obtained in the case of Mn, a red color is obtained in the case of $SmF_3$, a white color is obtained in the case of $La_2O_2S$ (Tb), a red color is obtained in the case of CaSiEu, a green color is obtained in the case of TbF$_3$, a blue color is obtained in the case of Cu and I, and a green color is obtained in the case of Cu and Al. As a result of the application of a voltage, accelerated electrons collide so that the electrons are excited from the activating agent level to the conduction band; and these electrons move through the material and re-couple with other ionized activating agent levels, thus emitting the light.

Conversely, light is received so that electron—positive holes are formed; and a current flows so that the reception of this light is detected. Accordingly, the above-described light receiving and emitting body functions as a light receiving element, and at the same time also functions as a light emitting element. Thus, the phrase "light receiving and emitting body" used with reference to the present invention refers to both cases in which the element has the function of a light receiving body and cases in which the element has the function of a light emitting body. Accordingly, the phrase "light receiving and emitting probe" also includes both cases in which the probe is used as a light receiving probe and cases in which the probe is used as a light emitting probe.

In the first embodiment, electrical light emission is caused to take place by using an alternating-current power supply as the power supply 20. There are also some materials in which the color of the light that is emitted varies as the operating frequency varies. Furthermore, light emission may also be effected by means of a direct-current power supply in cases where an electroluminescent material such as ZnS, etc., is formed as a thin film.

In order to form the light receiving and emitting body 15 on the conductive nanotube probe needle 10, PVD (physical vapor deposition) or CVD (chemical vapor deposition) can be used. The material of the light receiving and emitting body that adheres to unnecessary portions can be removed by electron beam irradiation or ion beam irradiation.

Carbon nanotubes are a typical example of conductive nanotubes. The cross-sectional diameters of carbon nanotubes range from approximately one (1) nanometer (nm) to several tens of nanometers, and the axial lengths of such nanotubes range from the nanometer order to the micron order, so that such carbon nanotubes have an extremely large aspect ratio (axial length/diameter). The property of such nanotubes that directly relates to the present invention is the cross-sectional diameter; the smallest theoretical value that can be realized from the structure of such nanotubes is approximately 1 nm. The cross-sectional diameter of the conductive nanotube probe needle 10 shown in FIG. 1 is approximately 1 nm.

The operation of the light receiving and emitting probe of the above-described structure will be described below.

When the switch 21 is turned on, an alternating-current voltage is applied to the light receiving and emitting body 15 by the power supply 20. As a result of the application of this voltage, the light receiving and emitting body 15 is excited and emits light, so that the area in the vicinity of the tip end 10c of the conductive nanotube probe needle 10 is illuminated by the light in a pinpoint fashion as indicated by arrows 23.

This light receiving and emitting probe 19 is a light emitting probe and is at the same time a probe for a scanning microscope. By performing an AFM scan over the surface 22a of the sample 22, the tip end 10c of the conductive nanotube probe needle 10 can acquire an image of this surface. If the sample surface 22a is temporarily illuminated in a pinpoint fashion by the light that is emitted from the light receiving and emitting body 15 during this imaging, the movement of surface atoms, etc. caused by illumination can be detected. Furthermore, this light receiving and emitting body 15 receives in a pinpoint fashion the light that is emitted from specified groups of atoms, so that the emission of light by the sample can also be detected.

In other words, this light receiving and emitting probe 19 is not merely a device that illuminates nano-regions in a pinpoint fashion and receives light from these nano-regions but is also a device that can detect phenomena caused by illumination, such as photo-electric effects, photo-magnetic effects, photo-mechanical effects, etc. by the use of the AFM function of the light receiving and emitting probe 19. If surface atoms show movement as a result of illumination with light, this movement can be captured by the AFM function.

Figure 2:
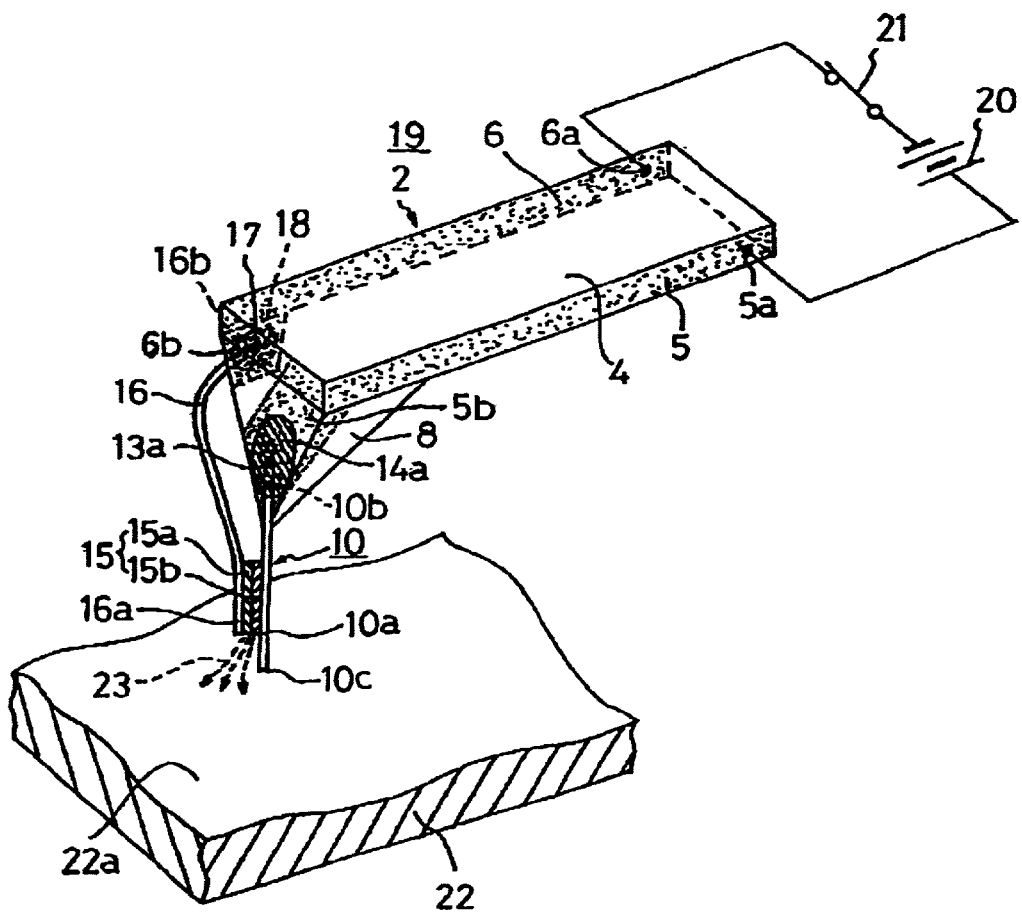
FIG. 2 is a schematic perspective view of a second embodiment of the light receiving and emitting probe according to the present invention.

FIG. 2 shows the second embodiment of the light receiving and emitting probe of the present invention.

Elements that are the same as in the first embodiment are referred to with the same reference numerals, and a description of such elements is omitted. The feature of the second embodiment that differs from the first embodiment is the presence of the light receiving and emitting body 15 obtained by joining electrode films 5b and 6b and a PN junction system.

More specifically, the first point of difference is that joining electrode films 5b and 6b are provided on the holder 8 instead of the conductive nanotube lead wire 12. These joining electrode films 5b and 6b are electrically continuous with the electrode films 5 and 6. Accordingly, the application of a voltage to the conductive nanotube probe needle 10 is made possible merely by fastening the base end portion 10b of the conductive nanotube probe needle 10 with the thermally fused portion 13a and/or the coating film 14a. Likewise, the lead wire end portion 16b is fastened to the joining electrode film 6b by a thermally fused portion 17 and/or coating film 18.

In other words, the conductive nanotube lead wire 12, thermally fused portion 13b and coating film 14b that are required in the first embodiment are unnecessary in the second embodiment; and in this second embodiment, processes required for such elements can be dispensed with. The formation of the joining electrode film 5b can be accomplished at the same time as the formation process of the electrode films 5 and 6. Therefore, the number of processes and the manufacturing cost can be reduced.

The second point of difference in the second embodiment is that a PN junction system comprising an N type semiconductor layer 15a and a P type semiconductor layer 15b is used as the light receiving and emitting body 15 instead of an electroluminescent system excited by the high electric field. The N type semiconductor layer 15a can be called an electron transporting layer, and the P type semiconductor layer can be called a positive hole transporting layer. Thus, the thickness of these layers is extremely small compared to that of general semiconductors; and the minimum thickness required for formation on the circumferential surface of the conductive nanotube probe needle 10 is a few molecules layers. The electron transporting layer 15a and positive hole transporting layer 15b are formed by depositing one molecule at a time while self-organizing films are formed.

The semiconductor materials include inorganic materials and organic materials. Inorganic materials can be Si type, GaAs type, Al$_x$Ga$_{1-x}$As type, InP type, In$_x$Ga$_{1-x}$As$_y$P$_{1-y}$ type, GaP type and GaAs$_x$P$_{1-x}$ type materials, etc. These materials are formed into P type semiconductors by adding P type impurities or into N type semiconductors by adding N type impurities.

Organic semiconductors can be positive hole transporting materials (P type semiconductors) and electron transporting materials (N type semiconductors). Numerous materials of these types are described in the paper titled "*Progress in Electroluminescent Device Using Molecular Thin Films*" (Tetsuo Tsutsui, MRS BULLETIN/JUNE 1997, pp. 3945). In this paper, abbreviate names are noted with the molecular structures indicated in illustrations; organic substances such as TPD, α-NPD, mTADATA, HTM-1, TPTE, etc. are shown as positive hole transporting materials, while organic substances such as t-Bu-PBD, BND, OXD-7, OXD-Star, TAZ, Alq, Bebq, BAlql, ZnPBO, ZnPBT, DTVBi, DCM, QA, Rubrene, Perylene, etc. are shown as electron transporting materials.

The N type semiconductor layer $15a$ and P type semiconductor layer $15b$ are joined to form a PN junction. When an electric current is caused to flow in the forward direction so that electrons and positive holes are injected, then light is emitted from the PN junction part as a result of the re-coupling of electrons and positive holes. In FIG. 2, a voltage has been applied in the forward direction, and the sample surface $22a$ is illuminated by light 23 emitted from the junction part. Conversely, light emitted from the sample surface is received by the PN junction part, and this light is detected by the formation of electrons—positive holes.

Since no light receiving and emitting body 15 is formed at the tip end $10c$ of the conductive nanotube probe needle 10, the sample surface $22a$ can be subjected to AFM scanning by the tip end $10c$. The motion of surface atoms can be detected while the sample surface $22a$ is illuminated by light in a pinpoint fashion. If a magnetism-sensitive substance is fastened to the tip end $10c$, the magnetism effect of the sample surface $22a$ induced by illumination with light can be also detected.

FIGS. 3A through 3E show the steps of solution-using formation of the light receiving and emitting body (a formation of the light receiving and emitting body by the use of a solution) on the conductive nanotube probe needle. In these diagrams, the case of a PN junction system is illustrated as the light emitting body 15.

Figure 3A:
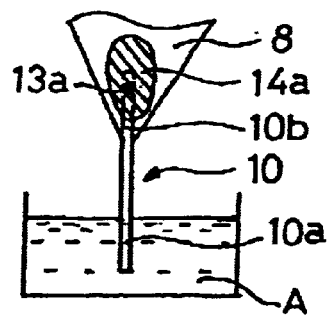
FIGS. 3A through 3E are process diagrams showing the solution-using formation of the light receiving and emitting body on the conductive nanotube probe needle.
Figure 3B:
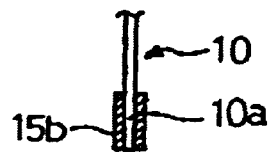

In step of FIG. 3A, the tip end portion $10a$ of the conductive nanotube probe needle 10 is immersed in a solution in which a positive hole transporting material A is dispersed and dissolved. As a result, in step of FIG. 3B, the positive hole transporting material A adheres in layer form to the tip end portion $10a$, so that a P type semiconductor layer $15b$ is formed.

Figure 3C:
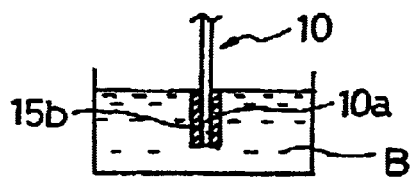
Figure 3D:
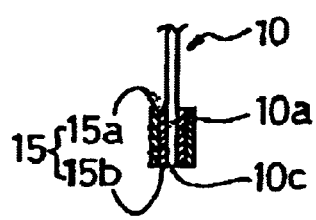

In step of FIG. 3C, the tip end portion $10a$ of the conductive nanotube probe needle 10 is immersed in a solution that includes an electron transporting material B dispersed and dissolved therein. As a result, in step of FIG. 3D, the electron transporting material B adheres in a layer form so that an N type semiconductor layer $15a$ is formed over the P type semiconductor layer $15b$ at the tip end portion $10a$. A PN junction is formed by the double-layer formation of the P type semiconductor layer $15b$ and N type semiconductor layer $15a$. In cases where it is necessary to remove the light receiving and emitting body 15 only in the vicinity of the tip end $10c$, this can be accomplished by irradiating the vicinity of the tip end with an ion beam.

Figure 3E:
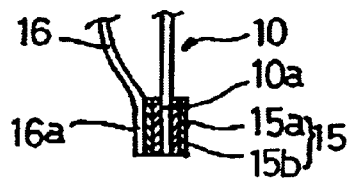

The light emitting body 15 is obtained by the P type semiconductor layer $15b$ and N type semiconductor layer $15a$. The end portion $16a$ of a conductive nanotube lead wire 16 is connected to the surface of this N type semiconductor layer $15a$ as shown in FIG. 3E. This connection is accomplished by beam fusion inside a magnifying apparatus such as an electron microscope, etc.

In the above description, the N type semiconductor layer $15a$ is formed over the P type semiconductor layer $15b$. However, it is also possible to form the P type semiconductor layer $15b$ on top of the N type semiconductor layer $15a$. The application of a voltage in the forward direction or the application of a voltage in the reverse direction can be freely accomplished by adjusting the polarity of the power supply 20. Furthermore, it goes without saying that above-described solution-using formation process can be utilized when an electroluminescent material is formed.

The layer formation of a light emitting body using a PN junction system or an electroluminescent system can also be accomplished with the use of a PVD process or CVD process inside a vacuum apparatus instead of the solution formation process. An electron microscope apparatus, a focused ion beam apparatus, etc. may also be used in order to perform the layer formation process while imaging the process.

Figure 4:
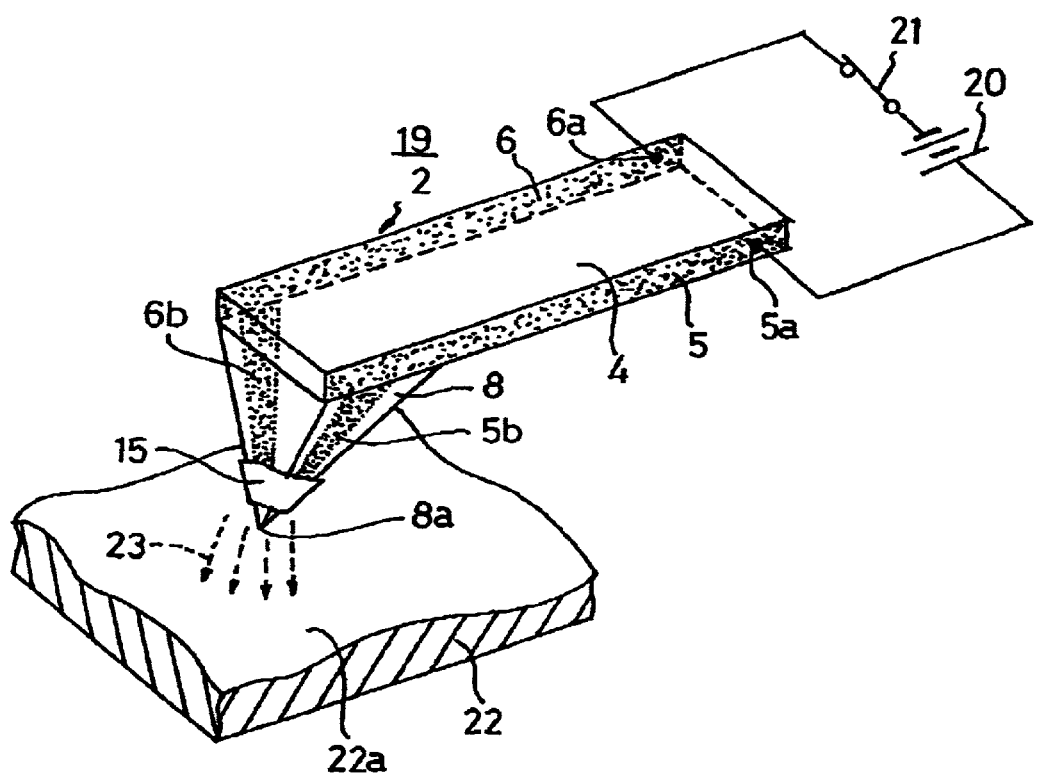
FIG. 4 is a schematic perspective view of a third embodiment of the light receiving and emitting probe according to the present invention.

FIG. 4 shows the third embodiment of the light receiving and emitting probe of the present invention.

In this embodiment, a conductive nanotube probe needle is not used. Instead, the light receiving and emitting probe 19 is formed using the AFM cantilever 2 "as is". The structure of the cantilever portion on which the electrode films 5 and 6 are formed is the same as in the first embodiment, and a description of the cantilever portion is omitted.

The feature of the third embodiment of the light receiving and emitting probe is that two joining electrode films $5b$ and $6b$ are formed on the protruding portion that constitutes the probe needle of the cantilever 2, i.e., the holder 8, and the light receiving and emitting body 15 is formed so that both ends of this body are connected to these joining electrode films $5b$ and $6b$. The joining electrode films $5b$ and $6b$ are electrically continuous with the electrode films 5 and 6.

In this third embodiment, the light receiving and emitting body 15 is formed so that the tip end $8a$ of the holder 8 that forms the probe needle point is left uncovered. Accordingly, with the use of this light receiving and emitting probe 19, the sample surface $22a$ can be subjected to an AFM scan by the tip end $8a$ of the holder while light is received or emitted by the light receiving and emitting body 15. The tip end $8a$ of the holder does not have as fine a resolution as the tip end $10c$ of the above-described conductive nanotube probe needle 10. However, since the AFM cantilever 2 is used, the resolution is sufficient for an AFM function.

For the light receiving and emitting body 15, an electroluminescent light receiving and emitting body or a PN junction light receiving and emitting body is used. In the case of an electroluminescent light receiving and emitting body, a voltage can be applied by means of the electrode film structure shown in FIG. 4. In the case of a PN junction light receiving and emitting body, since two layers are joined in a PN junction, a voltage must be applied to the upper and lower layers. Accordingly, this can be accomplished by leaving one of the joining electrode films $5b$ or $6b$ "as is", and forming the other joining electrode film on the upper layer of the light receiving and emitting body. Furthermore, in regard to this upper layer, the upper layer and the electrode film may be electrically connected by means of a conductive nanotube lead wire.

Figure 5:
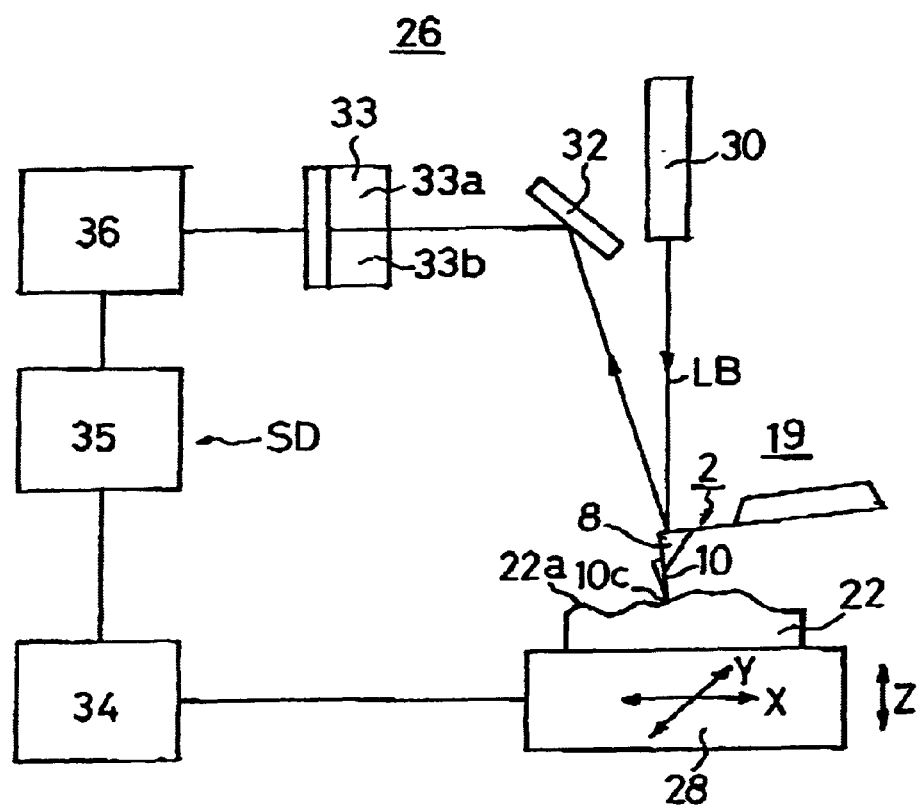
FIG. 5 is a structural diagram of a first embodiment of the light receiving and emitting probe apparatus according to the present invention.

FIG. 5 shows the first embodiment of the light receiving and emitting probe apparatus of the present invention.

The light receiving and emitting probe apparatus 26 includes the light receiving and emitting probe 19 and a scanning mechanism SD for this probe. The light receiving and emitting probe 19 used in this embodiment is the light receiving and emitting probe shown in FIG. 1 or 2 in which the conductive nanotube probe needle 10 is employed. The light receiving and emitting probe 19 is detachably fastened to a holder setting section (not shown). Replacement of the probe is accomplished by only changing the light receiving and emitting probe 19. After fastening the light receiving and emitting probe 19 to the holder setting section, the tip end 10c of the conductive nanotube probe needle 10 of the light receiving and emitting probe 19 is brought so as to be in the vicinity of the surface 22a of the sample 22.

The sample 22 is driven in the X, Y and Z directions by a scanning driving section 28 that is comprised of consisting of piezo-electric elements. The reference numeral 30 is a semiconductor laser device, 32 is a reflective mirror, 33 is a two-part light detector including an upper detector 33a and a lower detector 33b, 34 is an XYZ scanning circuit, 35 is an AFM display device, and 36 is a Z-axis detection circuit.

First, the tip end 10c of the conductive nanotube probe needle 10 is brought to approach the surface 22a of the sample 22 until the tip end 10c reaches a specified repulsive-force position. Afterward, with the Z position fixed, the scanning driving section 28 is moved to scan in the X and Y directions by the scanning circuit 34. In this case, the light receiving and emitting body 15 (see FIGS. 1 and 2) can be caused to receive and emit light by the control circuit C, so that a specified position is illuminated in a pinpoint fashion by the tip end 10c of the conductive nanotube probe needle 10 and so that light emitted from the sample can be received. Fluctuations in atomic plane caused by illumination with light are detected by the tip end 10c.

When the tip end 10c is operated to scan, the cantilever 2 is caused to flex by the indentations and projections of the surface atoms, and the reflected laser beam LB enters the two-part light detector 33 with the position of the beam displaced. The amount of displacement in the direction of the Z axis is calculated by the Z-axis detection circuit 36 from the difference in the amounts of light detected by the upper and lower detectors 33a and 33b, and a surface atom image is displayed by the AFM display device 35 with this amount of displacement taken as the amount of indentation and projection of the atoms. The effects of illumination with light can be ascertained by means of this surface atom image.

The AFM device described above detects indentations and projections in the surface of the sample by means of an optical lever system. However, a piezo-electric body system can also be utilized. In such a case, a piezo-electric body is fastened to the cantilever, the piezo-electric body is caused to expand and contract by the flexing of the cantilever, and indentations and projections in the sample surface are displayed by the voltage generated by the piezo-electric body.

Figure 6:
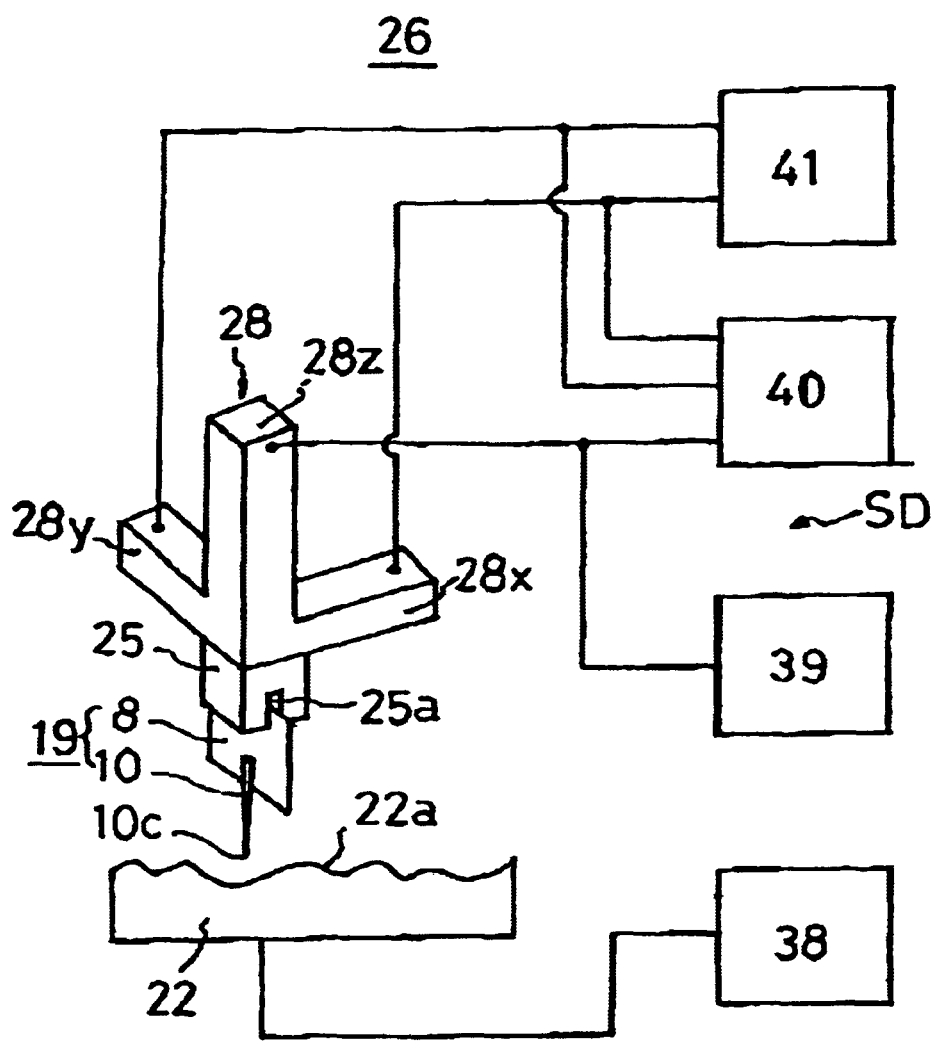
FIG. 6 is a structural diagram of a second embodiment of the light receiving and emitting probe apparatus according to the present invention.

FIG. 6 shows the second embodiment of the light emitting probe apparatus 26 of the present invention. In this embodiment, an STM holder is used instead of an AFM cantilever. Here, the term "STM" refers to a scanning type tunnel microscope. This holder 8 is an insulating flat-plate-form holder, and the probe apparatus is obtained by fastening a conductive nanotube probe needle 10 to this holder by means of fusion and a coating film.

The structure of the conductive nanotube probe needle 10 and holder 8 is exactly the same as in FIG. 1 or 2; accordingly, details are not shown. However, to describe the structure in brief, a light receiving and emitting body is deposited on the outer circumferential surface of the conductive nanotube probe needle 10, and one end of a conductive nanotube lead wire is fastened to this light receiving and emitting body. The control circuit C used for voltage application is connected to the other end of this conductive nanotube lead wire and the base end portion 10b of the conductive nanotube probe needle 10 via two electrode films. The light receiving and emitting body is caused to receive or emit light by this control circuit C, so that the area in the vicinity of the tip end 10c of the conductive nanotube probe needle 10 is subjected to light control.

The holder 8 is inserted in the cut-out groove 25a of a holder setting section 25 and is fastened in place in a detachable fashion by spring pressure. The scanning driving section 28, that includes an X piezo-electric element 28x, a Y piezo-electric element 28y and a Z piezo-electric element 28z, realizes scanning by the light emitting probe 19 with respect to the sample 22 by performing a three-dimensional expansion and contraction operation of the holder setting section 25 in the X, Y and Z directions. The reference numeral 38 is a tunnel current detection circuit, 39 is a Z-axis control circuit, 40 is an STM display device, and 41 is an XY scanning circuit.

First, the tip end 10c of the conductive nanotube probe needle 10 is brought to approach the surface 22a of the sample 22 to a point located at a specified distance in the Z direction by the Z-axis control circuit 39. Afterward, the surface conditions of the sample 22 are detected while scanning with the tip end 10c by the XY scanning circuit 41.

The concrete procedure of detection is as follows: first, the tip end 10c is subjected to expansion and contraction control in the Z direction by the Z-axis control circuit 39 so that the tunnel current at each XY position is constant, and this amount of movement is taken as the amount of indentation and projection in the direction of the Z axis. As the light receiving and emitting probe 19 is operated to scan in the X and Y directions, a surface atom image is displayed by the STM display device 40. The interrelationship between the light emitted by the light emitting body and the surface atom image varies according to the object of the research in question, and the control of light reception or light emission may be freely performed in accordance with this object. When the light receiving and emitting probe 19 is to be replaced, the holder 8 is removed from the holder setting section 25, and the entire light receiving and emitting probe 19 is replaced as a unit.

The light receiving and emitting probe apparatus 26 can be structured also using the light receiving and emitting probe of the third embodiment that is shown in FIG. 4. Since the structure of the light receiving and emitting probe apparatus that uses the light receiving and emitting probe of the third embodiment is the same as that shown in FIG. 5, details are omitted.

The present invention is not limited to the above-described embodiments. Various modifications and design alterations within the limits that involve no departure from the technical concept of the present invention are also included in the technical scope of the present invention.

As seen from the above, according to the light receiving and emitting probe of the present invention, a light receiving and emitting body is formed on the circumferential surface of a conductive nanotube probe needle, and the light receiving and emitting body receives and emits light by way of causing an electric current to pass through the light receiving and emitting body. Accordingly, a sample surface can be illuminated with light in a pinpoint fashion on the order of nanometers, and also light emitted from the sample surface is received. Furthermore, since the sample surface can be scanned by an AFM, etc. using the tip end of the conductive nanotube probe needle, the interrelationship between the received or emitted light and the physico-chemical response of the sample surface can be clarified, and an effective means for nano-science can be provided.

Furthermore, in the present invention, an AFM cantilever is utilized, a conductive nanotube probe needle is disposed on the protruding portion of this cantilever, and a light receiving and emitting body is provided on the circumferential surface of this conductive nanotube probe needle. Accordingly, the light receiving and emitting probe can be obtained in a relatively simple manner, and a conventional AFM device can be used "as is" to scan with the light receiving and emitting probe.

Also, since the probe is structured so that a voltage can be simultaneously applied to both ends of the light receiving and emitting body via conductive nanotube lead wires, both ends of the light receiving and emitting body and the electrode films can be freely electrically connected regardless of the configuration of the electrode films on the cantilever portion.

In addition, in the light receiving and emitting probe of the present invention, an AFM cantilever is utilized "as is", and a light receiving and emitting body is formed in the vicinity of the tip end of the protruding portion of this cantilever. Accordingly, a conventionally unobtainable light receiving and emitting probe that can receive light and emit light in very small regions can be obtained with the use of existing cantilevers. The light receiving and emitting region slightly increases in size compared to the structure in which a light receiving and emitting body is provided on the circumferential surface of a conductive nanotube probe needle; however, such devices complement each other, so that various types of light control in extremely small regions are accomplished.

Furthermore, in the light receiving and emitting probe apparatus according to the present invention, a scanning mechanism and a light emission control circuit are installed along with the above-described light receiving and emitting probe. Accordingly, light reception and light emission operations can be simultaneously performed at an arbitrary timing while freely controlling the scanning by the light receiving and emitting probe, and a great contribution can be made to the development of nano-science.

What is claimed is:

1. A light receiving and emitting probe comprising:
   a conductive nanotube probe needle with a base end portion thereof fastened to a holder and a tip end portion thereof protruded;
   a light receiving and emitting body provided on a circumferential surface of said conductive nanotube probe needle;
   a conductive nanotube lead wire fastened to said light receiving and emitting body, wherein light is received and emitted by means of said light receiving and emitting body.

2. A light receiving and emitting probe comprising:
   a conductive nanotube probe needle with a base end portion thereof fastened to a holder and a tip end portion thereof protruded,
   a light receiving and emitting body provided on a circumferential surface of said conductive nanotube probe needle,
   a conductive nanotube lead wire fastened to said light receiving and emitting body, and
   a means for applying an electric voltage between both ends of said conductive nanotube lead wire and said conductive nanotube probe needle, wherein
   light is received and emitted by means of said light receiving and emitting body.

3. The light receiving and emitting probe according to claim 2, wherein:
   an AFM cantilever in which a protruding portion used as said holder is formed on a cantilever portion thereof is employed,
   two electrode films are provided on said cantilever portion,
   one end of said conductive nanotube lead wire is connected to one of said electrode films, and
   said conductive nanotube probe needle is connected to another of said electrode films, wherein
   an electric voltage is applied between said electrode films.

4. The light receiving and emitting probe according to claim 2, wherein:
   an AFM cantilever in which a protruding portion used as said holder is formed on a cantilever portion thereof is employed,
   two electrode films are provided on said cantilever portion,
   one end of said conductive nanotube lead wire is connected to one of said electrode films, and
   said conductive nanotube probe needle and another of said electrode films are connected by means of another conductive nanotube lead wire, wherein
   an electric voltage is applied between said electrode films.

* * * * *

UNITED STATES PATENT AND TRADEMARK OFFICE
CERTIFICATE OF CORRECTION

PATENT NO. : 6,703,615 B2
APPLICATION NO. : 10/074623
DATED : March 9, 2004
INVENTOR(S) : Yoshikazu Nakayama et al.

It is certified that error appears in the above-identified patent and that said Letters Patent is hereby corrected as shown below:

Title Page
Item [75], Inventors:   Change "Yoshikazu Nakayama, 9-4D4, 14-2, Kongsoke 1-chome, Hirakata-shi, Osaka 573-0084 ( JP ) ; Akio Harada, Osaka, ( JP )" to --Yoshikazu Nakayama, 9-404, 14-2, Korigaoka 1-chome, Hirakata-shi, Osaka 573-0084 ( JP ) ; Akio Harada, Osaka ( JP )--

Signed and Sealed this

First Day of January, 2008

JON W. DUDAS
*Director of the United States Patent and Trademark Office*

UNITED STATES PATENT AND TRADEMARK OFFICE
CERTIFICATE OF CORRECTION

PATENT NO. : 6,703,615 B2
APPLICATION NO. : 10/074623
DATED : March 9, 2004
INVENTOR(S) : Yoshikazu Nakayama et al.

It is certified that error appears in the above-identified patent and that said Letters Patent is hereby corrected as shown below:

Item [75], Inventors: Change "Yoshikazu Nakayama, 9-4D4, 14-2, Kongsoke 1-chome, Hirakata-shi, Osaka 573-0084 (JP); Akio Harada, Osaka, (JP)" to --Yoshikazu Nakayama, 9-404, 14-2, Korigaoka 1-chome, Hirakata-shi, Osaka 573-0084 (JP); Akio Harada, Osaka (JP)--

Signed and Sealed this

Fifteenth Day of January, 2008

JON W. DUDAS
*Director of the United States Patent and Trademark Office*